(12) United States Patent
Jung et al.

(10) Patent No.: US 8,755,379 B2
(45) Date of Patent: Jun. 17, 2014

(54) APPARATUS AND METHOD FOR LINK DUPLICATION IN MOBILE COMMUNICATION SYSTEM

(75) Inventors: Ki-Sub Jung, Suwon-si (KR); Sang-Soo Kim, Suwon-si (KR); Jong-Hyune Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 668 days.

(21) Appl. No.: 12/289,706

(22) Filed: Oct. 31, 2008

(65) Prior Publication Data

US 2009/0141720 A1 Jun. 4, 2009

(30) Foreign Application Priority Data

Nov. 2, 2007 (KR) .............................. 2007-0111430

(51) Int. Cl.
*H04L 12/28* (2006.01)
*H04L 12/56* (2006.01)
(52) U.S. Cl.
CPC ................ *H04L 47/10* (2013.01); *H04L 47/36* (2013.01); *H04L 47/2433* (2013.01); *H04L 47/30* (2013.01)
USPC ........................................ 370/390; 710/316
(58) Field of Classification Search
CPC .................................................... H04L 1/0086
USPC ......... 370/390, 218, 329, 235, 230, 419, 412, 370/432; 361/119
See application file for complete search history.

(56) References Cited

U.S. PATENT DOCUMENTS

| | | | | |
|---|---|---|---|---|
| 2001/0050901 | A1* | 12/2001 | Love et al. | 370/235 |
| 2004/0013124 | A1* | 1/2004 | Peebles et al. | 370/412 |
| 2004/0100980 | A1* | 5/2004 | Jacobs et al. | 370/412 |
| 2004/0146062 | A1* | 7/2004 | Parikh et al. | 370/419 |
| 2005/0243497 | A1* | 11/2005 | Cameron et al. | 361/119 |

(Continued)

FOREIGN PATENT DOCUMENTS

| | | |
|---|---|---|
| JP | 63-73736 | 4/1988 |
| JP | 2000-216815 | 8/2000 |

(Continued)

OTHER PUBLICATIONS

IPSJ Technical Report: User-transperent Ethernet Multilink Bonding System for Fault-tolerance and High Performance, Association of Information Processing Society, vol. 2007 No. 88 (Sep. 9, 2007),p. 49-54.

(Continued)

*Primary Examiner* — Dang Ton
*Assistant Examiner* — Lionel Preval
(74) *Attorney, Agent, or Firm* — Roylance, Abrams, Berdo & Goodman LLP

(57) ABSTRACT

An apparatus and method for enabling duplication between line cards of between physical links when Internet Protocol (IP) packet data of a backbone network is transmitted through a physical link (T1/E1/J1) in an IP-BSS system is provided. The apparatus includes a scheduler for examining a queue depth of queues stored in a queue buffer of each of a plurality of line cards. The apparatus also includes a virtual queue manager for receiving the queue depth from the scheduler, for fragmenting the IP packet received through a backbone network, for determining priority of the line cards according to the queue depth, and also for transmitting the fragmented packet according to the priority.

10 Claims, 10 Drawing Sheets

(56) References Cited

U.S. PATENT DOCUMENTS

| | | | |
|---|---|---|---|
| 2005/0243716 A1* | 11/2005 | Bitar et al. | 370/218 |
| 2005/0243853 A1* | 11/2005 | Bitar et al. | 370/432 |
| 2007/0121499 A1* | 5/2007 | Pal et al. | 370/230 |
| 2007/0253447 A1 | 11/2007 | Jiang | |
| 2009/0003271 A1* | 1/2009 | Khawer et al. | 370/329 |

FOREIGN PATENT DOCUMENTS

| | | |
|---|---|---|
| JP | 2002-232462 | 8/2002 |
| KR | 10-2005-0102715 A | 10/2005 |
| KR | 10-2007-0105931 A | 10/2007 |

OTHER PUBLICATIONS

Office Action dated Oct. 14, 2013 issued by the Korean Intellectual Property Office in counterpart Korean Application No. 10-2007-0111430.

Office Action dated Apr. 15, 2014 issued by the Korean Intellectual Property Office in counterpart Korean Application No. 10-2007-0111430.

* cited by examiner

APPARATUS AND METHOD FOR LINK DUPLICATION IN MOBILE COMMUNICATION SYSTEM

PRIORITY

This application claims priority under 35 U.S.C. §119(a) from Korean Patent Application No. 2007-111430 filed on Nov. 2, 2007, in the Korean Intellectual Property Office, the entire disclosure of which is hereby incorporated by reference.

BACKGROUND OF THE INVENTION

1. Field of the Invention

The present invention relates to an apparatus and method for a line card for processing Internet Protocol (IP) packet data in an IP-Base Station System (IP-BSS). More particularly, the present invention relates to an apparatus and method for enabling duplication between line cards and duplication between physical links when IP packet data of a backbone network is transmitted through a physical link (that is, T1/E1/J1) in an IP-BSS.

2. Description of the Related Art

In a general Internet Protocol-Base Station System (IP-BSS), when IP packet data is intended to be processed, the data has to be transmitted to a suitable physical link by the use of one line card.

FIG. 1 is a block diagram illustrating a line card of a conventional IP-BSS.

Referring to FIG. 1, a line card 110 includes a queue buffer 112 and a channel evaluator 114.

The queue buffer 112 of the line card 110 stores an IP packet received through a backbone network (for example, Asynchronous Transfer Mode (ATM)/Ethernet) 100, and then transmits the IP packet by using link information provided from the channel evaluator 114.

The channel evaluator 114 evaluates physical link information regarding an available time slot for each channel.

Since the number of physical links connected to one line card is limited in the IP-BSS, there is a problem in the processing of IP packet data when the physical link is extended.

Accordingly, there is a need for an apparatus and method for extending a plurality of line cards in an Internet Protocol-Base Station System (IP-BSS).

SUMMARY OF THE INVENTION

Exemplary embodiments of the present invention address at least the above-mentioned problems and/or disadvantages and provide at least the advantages described below. Accordingly, an aspect of exemplary embodiments of the present invention is to provide an apparatus and method for extending a plurality of line cards in an Internet Protocol-Base Station System (IP-BSS).

It is another aspect of the present invention to provide an apparatus and method for seamlessly maintaining a call connection when an extended line card is detached in an IP-BSS.

According to one aspect of an exemplary embodiment of the present invention, a link duplicate apparatus for fragmenting an IP packet and distributing the fragments to a plurality of slave cards is provided. The apparatus includes a scheduler for examining a queue depth of queues stored in a queue buffer of each of a plurality of line cards; and a virtual queue manager for receiving the queue depth from the scheduler, for fragmenting the IP packet received through a backbone network, for determining priority of the line cards according to the queue depth, and also for transmitting the fragmented packet according to the priority.

According to another aspect of an exemplary embodiment of the present invention, a method for fragmenting an IP packet and distributing the fragments to a plurality of slave cards in a link duplicate apparatus of an IP-BSS is provided. The method includes fragmenting the IP packet received through a backbone network; assigning a sequence number to the fragmented IP packet; examining a queue depth of queues stored in a queue buffer of each of a plurality of line cards; determining priority of the line cards according to the queue depth; and transmitting the fragmented packet to the line cards by allocating an amount of the fragmented packet to be transmitted according to the priority.

Other objects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, an apparatus and method for extending a plurality of line cards in an Internet Protocol-Base Station System (IP-BSS) will be described according to exemplary embodiments of the present invention. In the following descriptions, a fragment packet is defined as packet data which is obtained by fragmenting IP packet data input through a backbone network in a specific size.

Figure 1:
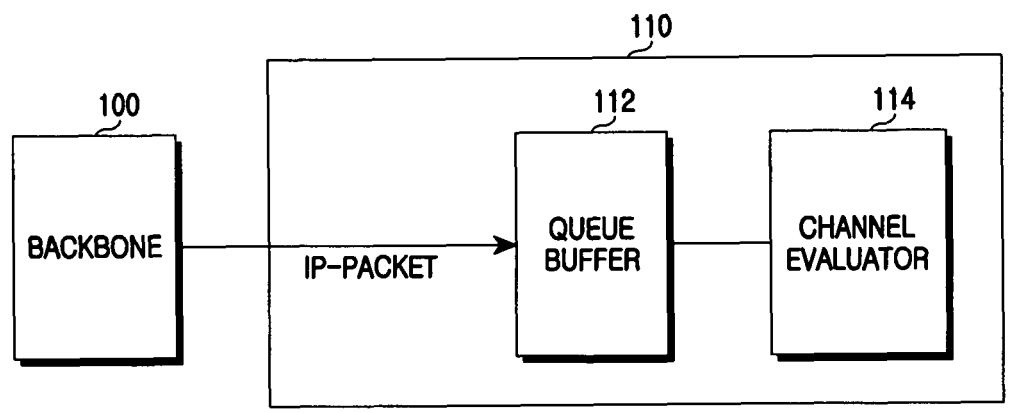
FIG. 1 is a block diagram illustrating a line card of a conventional Internet Protocol-Base Station System (IP-BSS)
Figure 2:
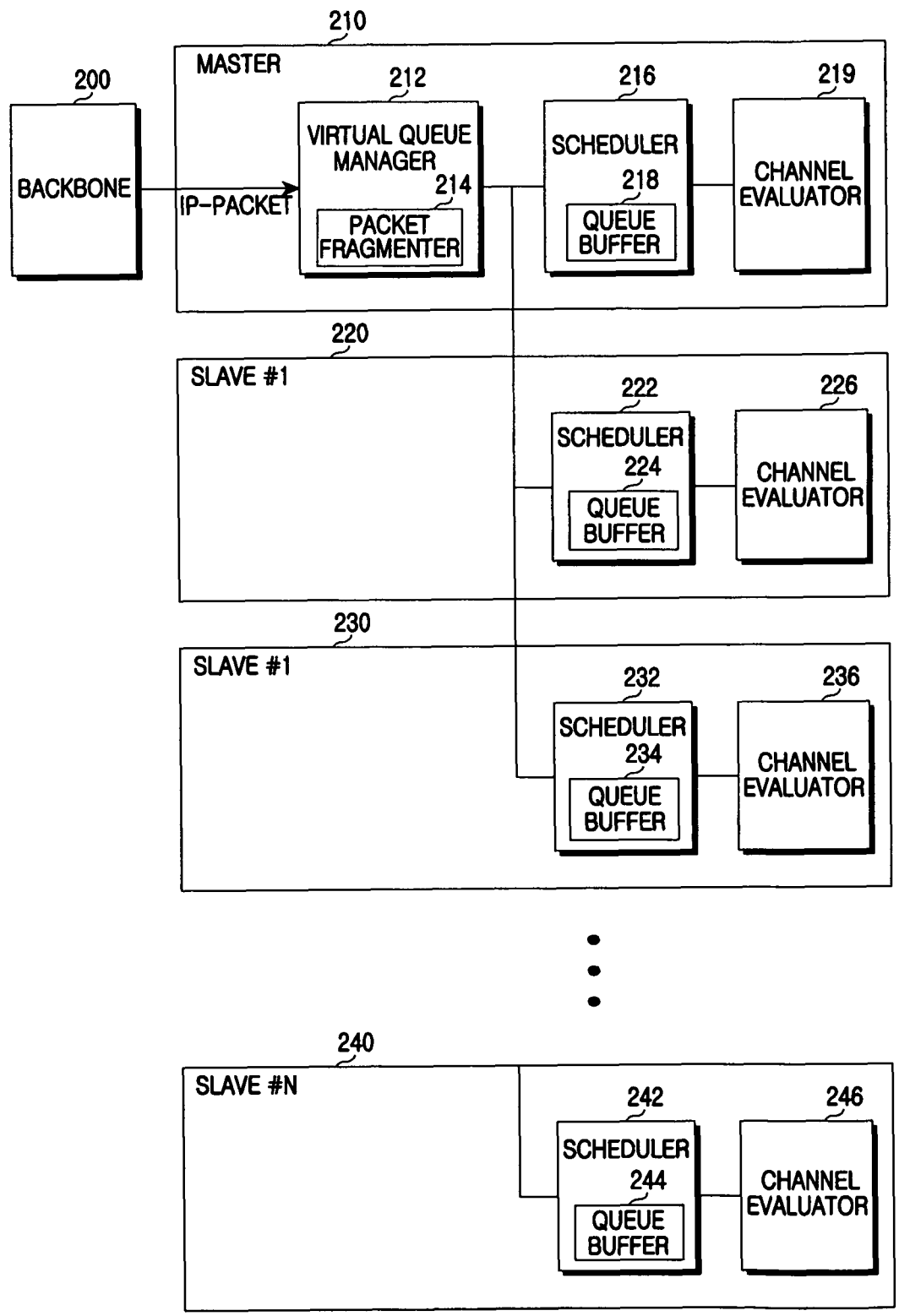
FIG. 2 is a block diagram illustrating a structure of an apparatus for duplicating a line card in an IP-BSS according to an exemplary embodiment of the present invention.

FIG. 2 is a block diagram illustrating a structure of an apparatus for duplicating a line card in an IP-BSS according to an exemplary embodiment of the present invention.

Referring to FIG. 2, the apparatus includes one master card 210 and a plurality of slave cards 220, 230, and 240. The master card 210 includes a virtual queue manager 212, a scheduler 216, and a channel evaluator 219. The slave cards 220, 230, and 240 respectively include schedulers 222, 232, and 242 and channel evaluators 226, 236, and 246. The scheduler 216 may include a queue buffer 218.

A structure of the master card 210 will first be described. The virtual queue manager 212 of the master card 210 controls a packet fragmenter 214 to fragment an IP packet received through a backbone network (for example, Asynchronous Transfer Mode (ATM)/Ethernet) 200. In the process of the IP packet fragmentation, the virtual queue manager 212 assigns a sequence number indicating the sequence of the IP packets. The sequence number is packet information which enables consecutive packet transmission in the case where the slave cards 220, 230, and 240 operate in substitution for the master card 210 when the master card 210 is down. The sequence number may indicate the sequence of previously transmitted packets or the sequence of subsequent packets to be continuously transmitted.

Further, the virtual queue manager 212 receives queue information (that is, a state of the queue buffer 218) from the scheduler 216 and determines priority of the slave cards 220, 230, and 240. Then, the virtual queue manager 212 provides fragment packets to the slave cards 230, and 240 according to the priority and allows the queue buffers 224, 234, and 244 of the slave cards 220, 230, and 240 to have the same state.

Upon receiving link information from the channel evaluator 219, the scheduler 216 transmits the fragment packets stored in the queue buffer 218 by using a corresponding link. The link information is physical link (for example, T1/E1/J1) information regarding an available time slot for each channel. Further, the scheduler 216 provides the state of the queue buffer 218 to the virtual queue manager 212.

The channel evaluator 219 evaluates the physical link information regarding the available time slot for each channel and provides the evaluation result to the scheduler 216.

The channel evaluator 226 of the slave card 220 performs the same operation as the channel evaluator 219 of the master card 210. The scheduler 222 provides information of a queue buffer 224 of the slave card 220 to the virtual queue manager 212 of the master card 210. Further, when the master card 210 is down, the scheduler 222 of the slave card 220 examines the sequence number included in the fragment packets so that the packets transmitted from the master card 210 can be continuously transmitted.

Figure 3:
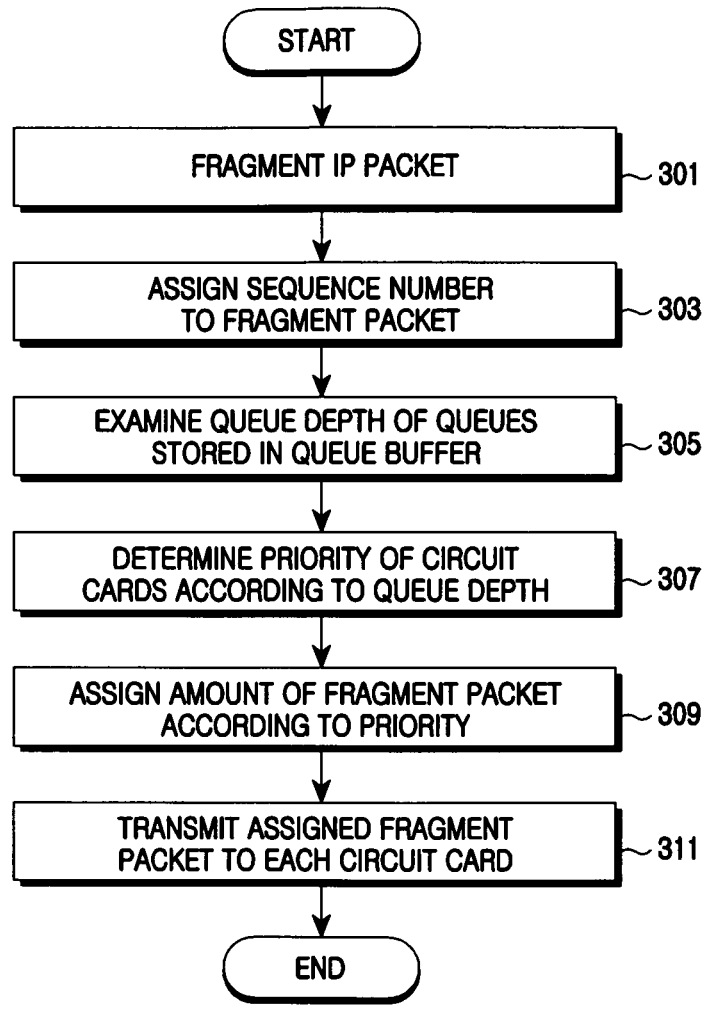
FIG. 3 is a flowchart illustrating a process of fragmenting an IP packet and distributing the fragments to a plurality of slave cards in a duplicate apparatus of an IP-BSS according to an exemplary embodiment of the present invention.

FIG. 3 is a flowchart illustrating a process of fragmenting an IP packet and distributing the fragments to a plurality of slave cards in a duplicate apparatus of an IP-BSS according to an exemplary embodiment of the present invention.

Referring to FIG. 3, a virtual queue manager fragments an IP packet received through a backbone network (for example, ATM/Ethernet) in step 301. In step 303, the virtual queue manager assigns a sequence number to a fragment packet. The fragment packet represents a packet which is obtained by fragmenting the IP packet input through the backbone network. The sequence number is packet information which enables consecutive packet transmission in a case where the slave cards operate in substitution for a master card when the master card is down. The sequence number may indicate the sequence of previously transmitted packets or the sequence of subsequent packets to be continuously transmitted. The sequence number may be included in a duplicate header of the fragment packet to be transmitted to the slave cards.

Then, a queue depth of queues stored in a queue buffer is examined in step 305, and priority of the line cards is determined according to the queue depth in step 307. The queue depth may be examined by receiving information on the queue buffer from a scheduler.

In step 309, an amount of the fragment packet to be transmitted according to the priority determined in step 307 are allocated so that the slave cards have the same queue depth. In step 311, the allocated amount of the fragment packet is transmitted to each line card (that is, slave card). Thereafter, the procedure of FIG. 3 ends.

Figure 4A:
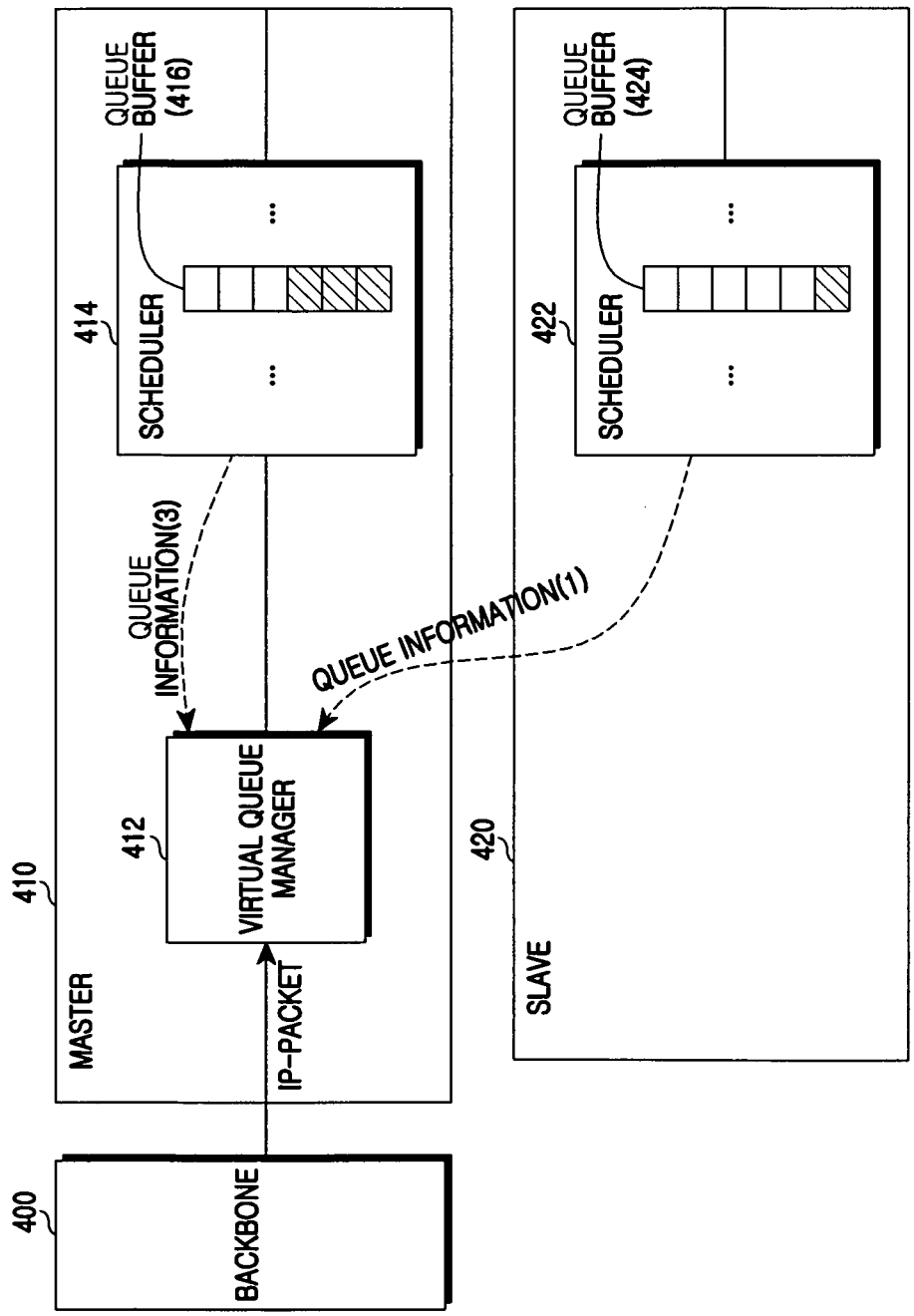
FIG. 4A illustrates a process of determining priority of line cards (that is, master and slave cards) by using queue information of a master card and a slave card, wherein the queue information is a queue depth of queues stored in queue buffers.
Figure 4B:
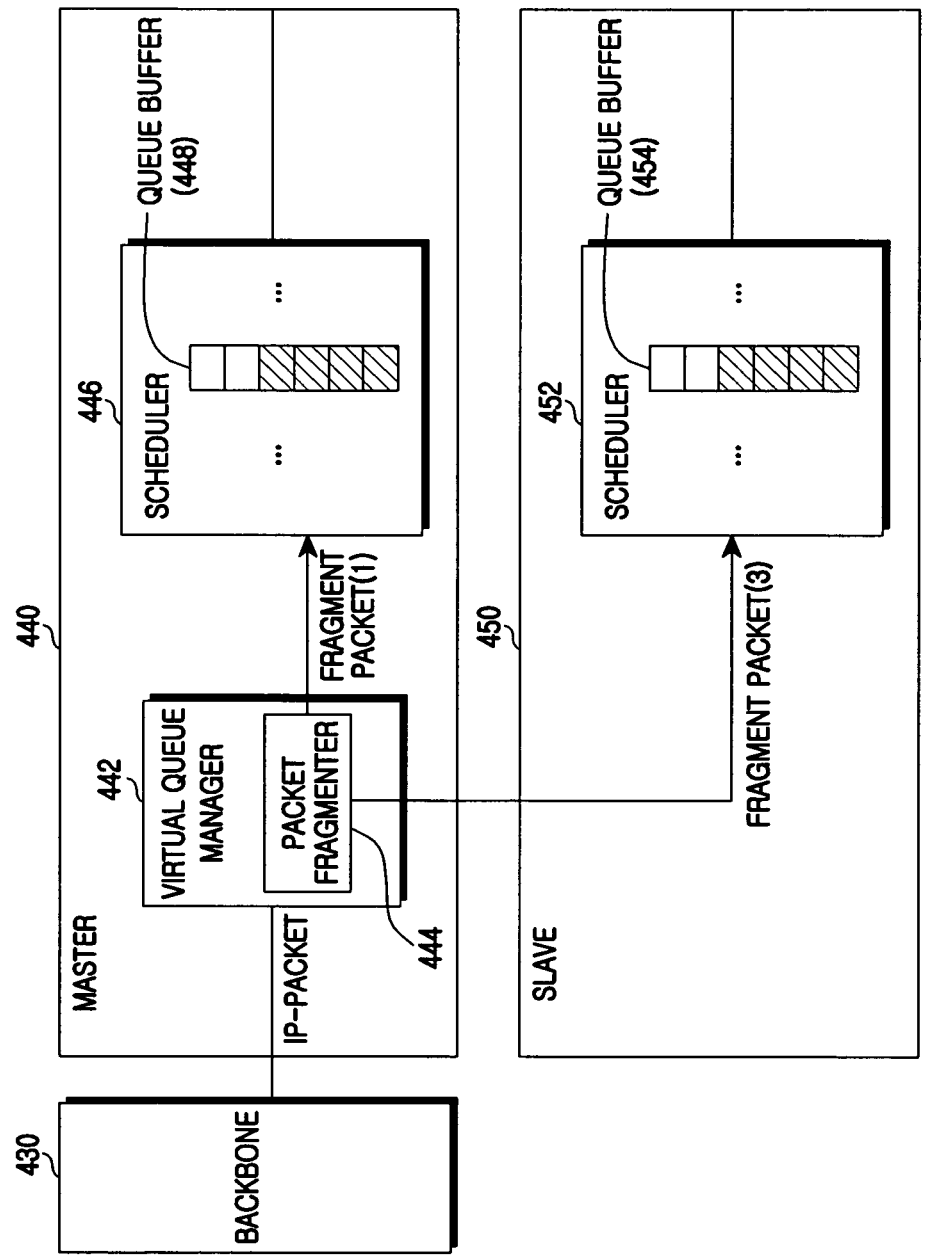
FIG. 4B illustrates a process of fragmenting an IP packet and distributing the fragments to a plurality of line cards.

FIGS. 4A and 4B illustrate a process of fragmenting an IP packet and distributing the fragments to a plurality of slave cards in a duplicate apparatus of an IP-BSS according to an exemplary embodiment of the present invention.

FIG. 4A illustrates a process of determining priority of line cards (that is, master and slave cards) by using queue information of a master card 410 and a slave card 420. The queue information is a queue depth of queues stored in queue buffers 416 and 424.

Referring to FIG. 4A, a scheduler 414 of the master card 410 examines the queue depth of queues stored in the queue buffer 416 and provides the queue depth to a virtual queue manager 412. The virtual queue manager 412 of the master card 410 assumes that an IP-packet input through a backbone network 400 has already been fragmented. For example, when the queues stored in the queue buffer 416 amount approximately to three depths indicated by slashes in FIG. 4A, the scheduler 414 transmits the queue information (3) to the virtual queue manager 412.

Similarly to the scheduler 414 of the master card 410, a scheduler 422 of the slave card 420 provides queue information (1) regarding on queues stored in the queue buffer 424 to the virtual queue manager 412 of the master card 410.

Upon receiving the queue information of the master card 410 and the slave card 420, the virtual queue manager 412 compares the two pieces of queue information and determines priority of the line cards. For example, the virtual queue manager 412 may determine that the slaver card 420 which provides the queue information (1) has a higher priority. That is, the virtual queue manager 412 may assign a first priority to the slave card 420 and a second priority to the master card 410.

FIG. 4B illustrates a process of fragmenting an IP packet and distributing the fragments to a plurality of line cards.

Referring to FIG. 4B, a scheduler 446 of the master card 440 examines the queue depth of queues stored in the queue buffer 448 and provides the queue depth to a virtual queue manager 442. A virtual queue manager 442 of a master card 440 assumes that an IP-packet input through a backbone network 430 has already been fragmented. The IP packet may be fragmented by a packet fragmenter 444 of the virtual queue manager 442.

Similarly to the scheduler 446 of the master card 440, a scheduler 452 of the slave card 450 provides queue information (1) regarding on queues stored in the queue buffer 454 to the virtual queue manager 442 of the master card 440.

When priority of the line cards is determined by the virtual queue manager 442 similarly to FIG. 4A, the virtual queue manager 442 assigns a fragment packet, which is obtained by fragmenting the IP-packet by the use of the packet fragmenter 444, according to the priority. For example, in order to allow a slave card 450 having a first priority and the master card 440 having a second priority to have the same queue depth, the virtual queue manager 442 transmits a fragment packet (3) to the slave card 450 and also transmits a fragment packet (1) to the master card 440.

Figure 5:
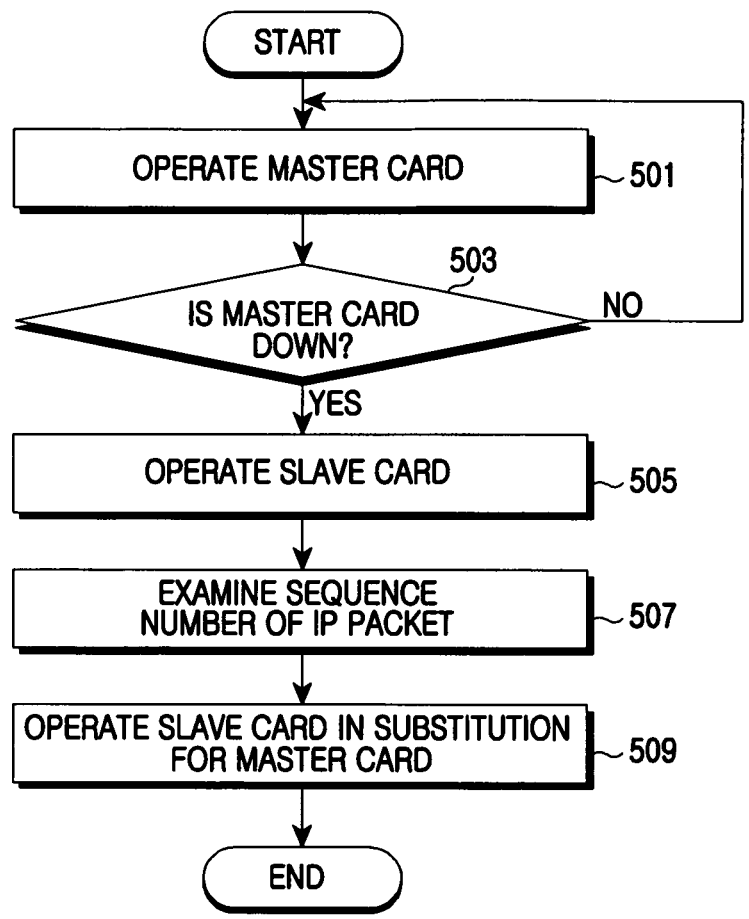
FIG. 5 is a flowchart illustrating a process of duplicating a line card in a duplicate apparatus of an IP-BSS according to an exemplary embodiment of the present invention.

FIG. 5 is a flowchart illustrating a process of duplicating a line card in a duplicate apparatus of an IP-BSS according to an exemplary embodiment of the present invention.

Referring to FIG. 5, a master card operates to transmit a packet in step 501. Then, it is checked whether the master card is down during operation in step 503. Step 501 is repeated until the master card is down.

Otherwise, if the master card is down, proceeding to step 505, a slave card operates. Then, in step 507, a sequence number of an IP packet received from the master card is examined. The sequence number is packet information which enables consecutive packet transmission in a case where the slave card operates in substitution for the master card when the master card is down. The sequence number may indicate the sequence of previously transmitted packets or the sequence of subsequent packets to be continuously transmitted. The sequence number may be included in a duplicate header of a fragment packet provided from the master card.

In step 509, a packet corresponding to the sequence number is transmitted so that the slave card operates in substitution for the master card. Thereafter, the procedure of FIG. 5 ends.

Figure 6A:
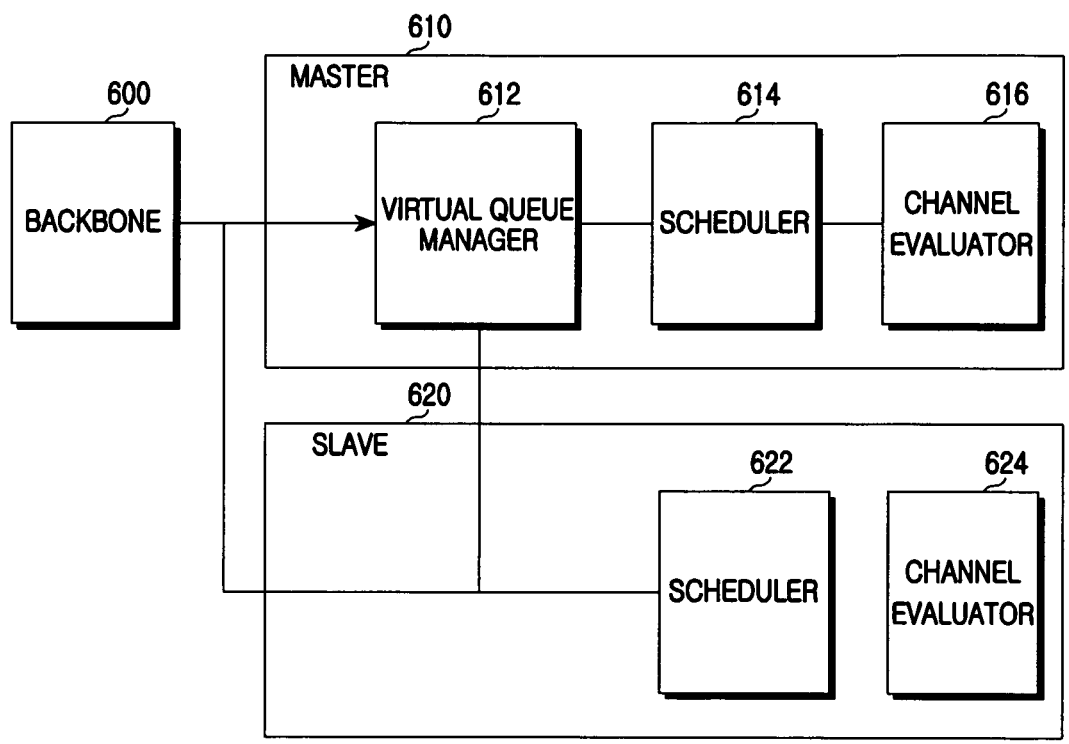
FIG. 6A illustrates a normal operation of a duplicate apparatus.
Figure 6B:
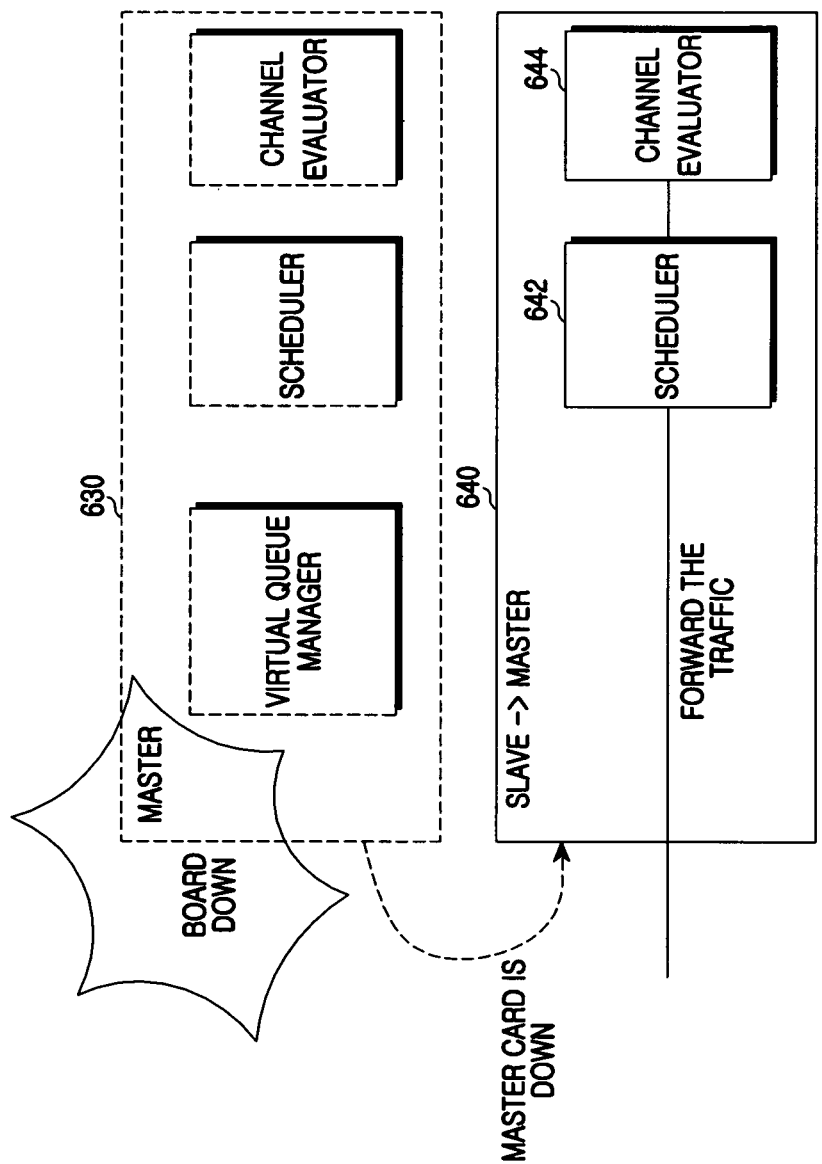
FIG. 6B illustrates an operation in which a slave card operates when a master card is down in a duplicate apparatus.

FIGS. 6A and 6B illustrate processes of duplicating a line card in a duplicate apparatus of an IP-BSS according to an exemplary embodiment of the present invention.

FIG. 6A illustrates a normal operation of a duplicate apparatus. Referring to FIG. 6A, an IP packet received through a backbone network 600 is transmitted by the use of a master card 610. The master card 610 includes a scheduler 614 and a channel evaluator 616. The slave card 620 includes a scheduler 622 and a channel evaluator 624.

Further, as described above with reference to FIG. 3, a fragment packet of the IP packet is transmitted to a slave card 620. Herein, packet transmission is achieved by the use of only the master card 610.

FIG. 6B illustrates an operation in which a slave card operates when a master card is down in a duplicate apparatus. Referring to FIG. 6B, when a master card 630 is down, a slave card 640 is allowed to operate in substitution for the master card 630. The slave card 640 includes a scheduler 642 and a channel evaluator 644.

The slave card 640 examines a sequence number of an IP packet provided from the master card 630 so that a corresponding IP packet is transmitted.

Figure 7A:
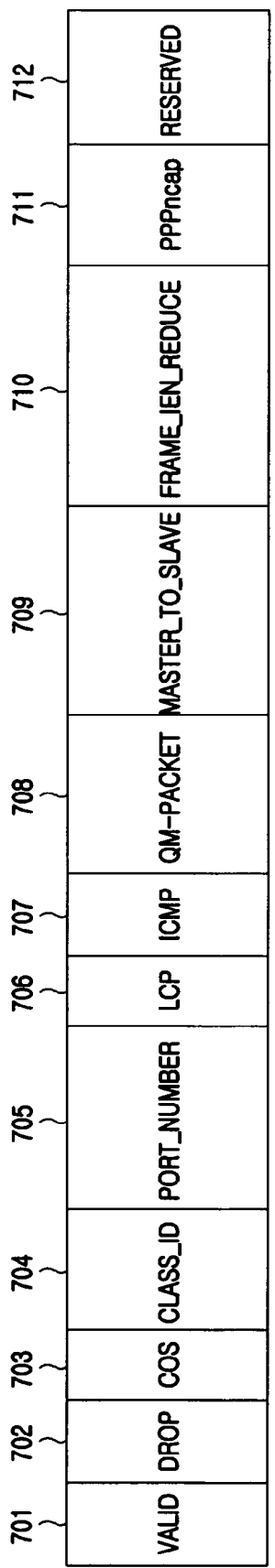
FIG. 7A illustrates a configuration of a duplicate header including information on transmission of a fragment packet and queue information in an IP-BSS according to an exemplary embodiment of the present invention.
Figure 7B:
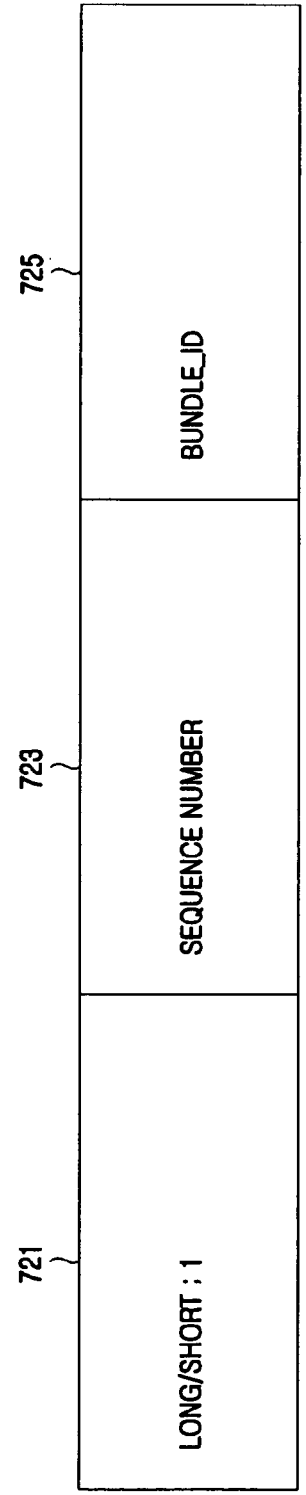
FIG. 7B illustrates a field including duplicate information of a duplicate header in an IP-BSS according to an exemplary embodiment of the present invention.
Figure 7C:
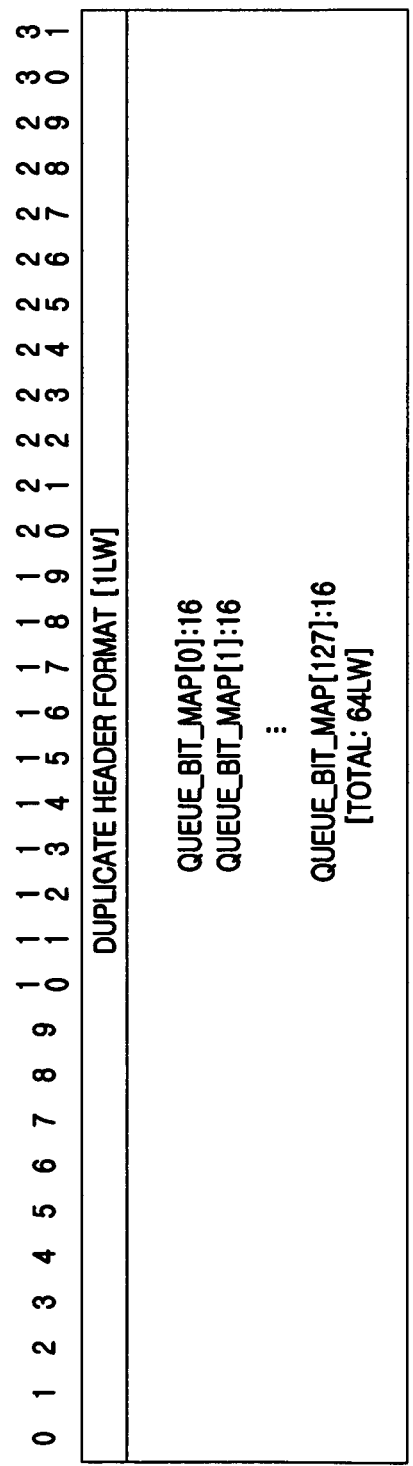
FIG. 7C illustrates a configuration of a queue information packet including queue buffer information in an IP-BSS according to an exemplary embodiment of the present invention.

FIGS. 7A, 7B and 7C illustrate configurations of a packet for a duplicate request in an IP-BSS according to an exemplary embodiment of the present invention.

FIG. 7A illustrates a configuration of a duplicate header including information on transmission of a fragment packet and queue information in an IP-BSS according to an exemplary embodiment of the present invention.

Referring to FIG. 7A, the duplicate header includes a plurality of fields, such as, valid 701, drop 702, COS 703, Class_id 704, Port_Number 705, LCP 706, ICMP 707, QM_Packet 708, master_to_slave 709, Frame_len_reduce 710, PPPncap 711 and reserved 712.

The valid field 701 is used to evaluate whether a packet is correctly transmitted. The drop field 702 is used to evaluate whether the packet is dropped because a master card is down. The Class Of Service (COS) field 703 indicates a multi-class value depending on a block which is fragmented by a virtual queue manager included in the master card. The Class_id field 704 indicates a class identifier of a link depending on a packet type (that is, normal PPP or LCP/IPCP) of the master card (or line card).

The Port_Number field 705 indicates a port number for outputting a fragment packet provided from the master card.

FIG. 7B illustrates a field including duplicate information of a duplicate header in an IP-BSS according to an exemplary embodiment of the present invention.

Referring to FIG. 7B, the duplicate field is one of fields shown in FIG. 7A and is packet information which enables consecutive packet transmission in a case where a slave card operates in substitution for a master card when the master card is down. Further, the duplicate field includes a sequence number field 723, which indicates the sequence of previously transmitted packets or the sequence of subsequent packets to be continuously transmitted, a long/short field 721, which indicates whether a corresponding sequence number is a long sequence number or a short sequence number, and a bundle_ID field 725, which is used to identify bundles and to examine a multi-control setup required for the bundles.

FIG. 7C illustrates a configuration of a queue information packet including queue buffer information in an IP-BSS according to an exemplary embodiment of the present invention.

A scheduler of a slave card periodically provides information on a queue buffer to a master card by using the queue information packet of FIG. 7C.

According to exemplary embodiments of the present invention, a plurality of physical links can be supported by the use of a duplicate apparatus for enabling the extension of a line card in an IP-BSS system. In addition, the duplicate apparatus can solve a call disconnection problem which may occur when the line card is placed.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A link duplicate apparatus for fragmenting an Internet Protocol (IP) packet and distributing the fragments to a plurality of cards, the apparatus comprising:

a scheduler for examining a queue depth of queues stored in a queue buffer of each of a plurality of line cards comprising a master card and slave cards; and a virtual queue manager for changing a packet transmitting priority of the master card and the slave cards, for fragmenting the IP received through a backbone network, and for transmitting the fragmented packets according to the packet transmitting priority of the master card and the slave cards;

wherein changing the packet transmitting priority of the master card and the slave cards is based on queue information from the master card and the slave cards;

wherein the IP packet is allocated so that all of the slave cards have the same queue depth, and wherein, when the IP packet data is transmitted by operating the slave card in substitution for the master card, a sequence number included in the fragmented packet is evaluated and then packet data, which is consecutive to the IP packet transmitted by the operation of the master card, is transmitted.

2. The apparatus of claim 1, wherein the sequence number is packet information which enables consecutive packet transmission in a case where the slave cards operate in substitution for the master card when the master card is down, and a sequence number indicates the sequence of previously transmitted packets or a sequence of subsequent packets to be continuously transmitted.

3. The apparatus of claim 1, wherein the virtual queue manager receives the queue depth from the scheduler, determines priority of the plurality of line cards according to the queue depth, and transmits the fragmented packet according to the priority.

4. The apparatus of claim 3, wherein the virtual queue manager assigns a sequence number in the process of fragmenting the IP packet.

5. The apparatus of claim 3, wherein, after transmitting the fragmented packet, if an operation of a master card is down, the IP packet data is transmitted by operating the slave cards in substitution for the master card.

6. A method for fragmenting an Internet Protocol (IP) packet and distributing the fragments to a plurality of cards in a link duplicate apparatus of an IP-Base Station System (BSS), the method comprising:

changing a packet transmitting priority among a plurality of line cards comprising a master card and slave cards;

fragmenting the IP packet received through a backbone network; and transmitting the fragmented packets according to the packet transmitting priority of the master card and the slave cards;

wherein changing the packet transmitting priority of the master card and the slave cards is based on queue information from the master card and the slave cards;

wherein the IP packet is allocated so that all of the slave cards have the same queue depth, and wherein, when the IP packet data is transmitted by operating the slave card in substitution for the master card, a sequence number included in the fragmented packet is evaluated and then packet data, which is consecutive to the IP packet transmitted by the operation of the master card, is transmitted.

7. The method of claim 6, further comprising:

assigning a sequence number to the fragmented IP packet;

examining a queue depth of queues stored in a queue buffer of each of a plurality of line cards;

determining priority of the plurality of line cards according to the queue depth; and transmitting the fragmented packet to the line cards by allocating an amount of the fragmented packet to be transmitted according to the priority.

8. The method of claim 7, further comprising, after transmitting the fragmented packet, if an operation of a master card is down, transmitting the IP packet by operating the slave cards in substitution for the master card.

9. The method of claim 8, further comprising evaluating a sequence number included in the fragmented packet and transmitting packet data which is consecutive to the IP packet transmitted by the operation of the master card.

10. The method of claim 9, wherein the sequence number is packet information which enables consecutive packet transmission in a case where the slave cards operate in substitution for the master card when the master card is down, and the sequence number indicates the sequence of previously transmitted packets or the sequence of subsequent packets to be continuously transmitted.

* * * * *